May 15, 1945.  H. M. EVJEN  2,375,778
APPARATUS FOR MAKING GEOPHYSICAL EXPLORATIONS
Filed Feb. 19, 1944
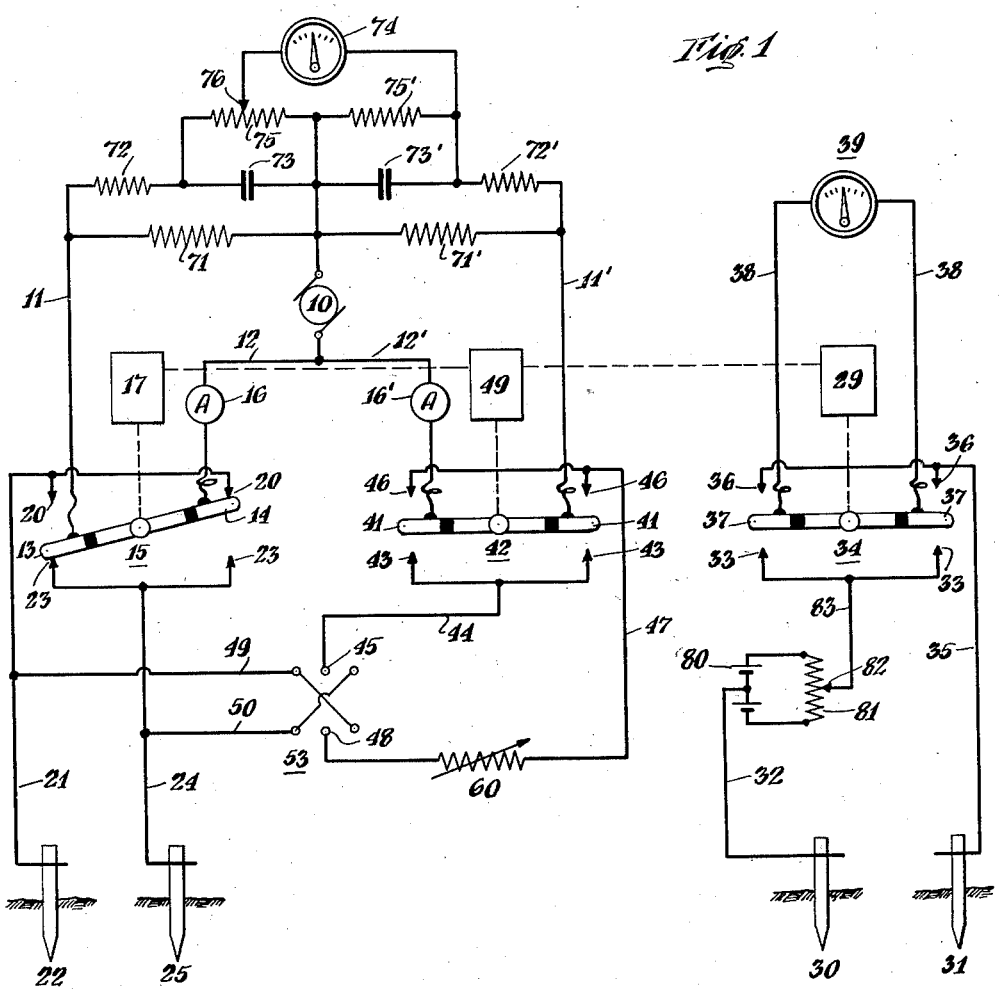
Fig. 1
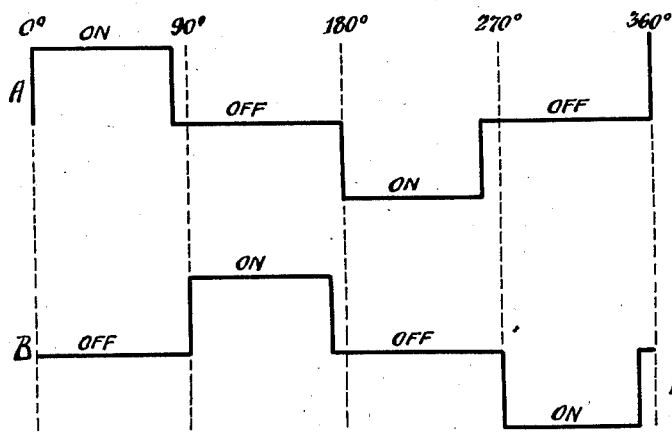
Fig. 2
INVENTOR.
Haakon M. Evjen
BY
ATTORNEY Patented May 15, 1945

2,375,778

UNITED STATES PATENT OFFICE 2,375,778

APPARATUS FOR MAKING GEOPHYSICAL EXPLORATIONS

Haakon M. Evjen, Houston, Tex., assignor to Nordel Corporation, Houston, Tex., a corporation of Delaware Application February 19, 1944, Serial No. 523,026

12 Claims. (Cl. 175—182)

This invention relates to systems for making geophysical explorations wherein a current having a controlled low frequency of the order of from one-half cycle to 20 cycles per second is passed through the earth between spaced electrodes and the ground potential is picked up by a pair of potential electrodes located within the field of influence of the earth current.

I have discovered that when a commutated current is passed into the ground the potential difference between any two fixed points in the ground will generally not be in phase with the current. A phase displacement will exist which varies with the frequency of alternation or commutation of the current. From the manner in which this phase displacement varies with frequency useful deductions can be drawn concerning the presence of valuable minerals in the ground. Such measurements are particularly significant at very low frequencies where the ordinary alternating current technique will not produce satisfactory results.

The present invention provides a novel and improved system for the direct measurement at very low frequencies of a quantity which is a function of the phase angle between the alternating current passed into the ground and the potential drop existing between any two points within the field of influence of the ground current. Such points may comprise electrodes placed in contact with the ground at any location on the surface of the earth or in bore holes, or magnetic pick-up loops or wires, or the like. The current is periodically interrupted and reversed as by a motor driven commutator or switch to provide an alternating current in the form of spaced, flat-topped pulses.

A current pulse of definite duration is passed into the ground in one direction. The current is then interrupted for a definite period of time, hereinafter called the current gap, and is then passed into the ground in the opposite direction, after which the current is again interrupted and the cycle repeated. For convenience and, by analogy to usual alternating current terminology, the tangent of the phase angle is defined as the ratio of the time average of the potential drop between given points during a current gap interval to the time average of the potential drop between said points while the current is passed through the current electrodes into the ground or, expressed in another way, the ratio between the out-of-phase picked-up potential to the in-phase picked-up potential.

In accordance with the present invention the potential produced by the out-of-phase component of the earth current, is opposed by the potential produced by the in-phase component of a second current passed into the earth during the gap interval of the first current. This second current is adjusted to counteract the effects of the first current and to produce a null balance in the picked-up potential circuit. The ratio of this second current to the principal current represents the tangent of the phase angle of the picked-up potential.

It is an object of the present invention to provide a novel and improved system for measuring the above mentioned ratio.

Another object is to provide a geophysical prospecting system having novel and improved characteristics.

Various other objects and advantages will be apparent as the nature of the invention is more fully described.

The invention will be better understood by referring to the following description, taken in connection with the accompanying drawing in which a specific embodiment thereof has been set forth for purposes of illustration.

In the drawing,

Fig. 1 is a diagrammatic representation of a geophysical prospecting system embodying the present invention; and Fig. 2 is a series of curves illustrating the operation of the system shown in Fig. 1.

In the following description certain specific terms have been used for convenience in referring to various details of the invention. It is to be understood, however, that these terms are to be given as broad an interpretation as the state of the art will permit.

Referring to the drawing more in detail, a source 10 of direct current is connected by means of lines 11 and 12 to movable contacts 13 and 14 respectively of a motor-driven reversing switch 15, which may be of any suitable type, for example, of the type set forth in Evjen Patent 2,314,874, dated March 30, 1943, which shows a switch adapted to reverse the circuit connections at a predetermined frequency and having an adjustable gap or clearance to control the times of reversal, the current intervals, and the gap intervals. The switch may be driven by suitable means indicated diagrammatically at 17. An ammeter 16 is shown as connected in the line 12 for purposes of regulation and control.

The reversing switch 15 is shown as provided with a pair of stationary contacts 20 connected by a line 21 to an earth current electrode 22, and with a pair of stationary contacts 23 connected by a line 24 to a second earth current electrode 25.

The source 10 is also connected by lines 11' and 12' to movable contacts 41 of a reversing switch 42 which may be similar to the switch 15 above described and is driven by a suitable means indicated diagrammatically at 49. The switch 42 is provided with a pair of stationary contacts 43 connected by a line 44 to the blade 45 of the reversing switch 53 and with a pair of stationary contacts 46 connected by a line 47 through a variable resistance 60 to the blade 48 of the reversing switch 53. The reversing contacts of the switch 53 are connected by lines 49 and 50 to the ground leads 21 and 24 respectively. An ammeter 16' is shown as connected in the line 12' to indicate the current flow.

Resistances 71 and 71' are connected in the lines 11 and 11' respectively to develop a voltage drop proportional to the current flow in the respective lines. A resistance 72 and a condenser 73 are connected in series across the resistance 71. A similar resistance 72' and a condenser 73' are connected in series across the resistance 71'. Discharge resistances 75 and 75' are connected respectively across the condensers 73 and 73'. A voltmeter 74 is connected across the resistance 75' and a portion of the resistance 75 determined by a movable contact 76.

The potential pick-up circuit comprises a pair of pick-up electrodes 30 and 31 which are located within the field of influence of the earth current. The pick-up electrode 30 is connected by a line 32 to the mid-point of a battery 80. A potentiometer 81 is connected across the battery 80 and is provided with an adjustable tap 82 connected by line 83 to stationary contacts 33 of a third reversing switch 34 which is similar to the switch 15 above referred to and is driven by driving mechanism indicated at 29. The pick-up electrode 31 is connected by a line 35 to stationary contacts 36 of said switch 34. The movable contacts 37 of said switch 34 are connected by lines 38 to a direct current measuring instrument 39 shown as a null balance galvanometer.

The reversing switches 15 and 34 are interconnected for operation in unison, but 90° out of phase, so that the contacts of one switch are closed while the contacts of the other switch are open and vice versa, but with a lag such that the contacts of the two switches are never closed at the same time. The reversing switch 42 is connected for operation in phase with the switch 34 and with its contacts similarly timed.

The sequence of operation of the reversing switches is illustrated in curves A and B in Fig. 2. Curve A represents the current passed into the ground from electrodes 22 and 25 and it will be noted that the current is passed through the ground in one direction during a period of about 85°, is interrupted for an interval of about 95° and is then passed through the ground in the opposite direction for a period of about 85° and is interrupted for another interval of about 95°.

The curve B in Fig. 2 indicates the operation of the reversing switches 34 and 42 which are set for about 85° measuring intervals and about 95° gap intervals. The on intervals of curve B are offset to occur at the center of the gap intervals of curve A and vice versa, so that the potential pick-up circuit and the switch 42 may be considered to the operated 90 electrical degrees out of phase with respect to the earth current circuit.

Operation

In the operation of this device an earth current is produced between the electrodes 22 and 25 when the contacts of the reversing switch 15 are closed. This current is in the form of a flat top wave which is periodically interrupted and reversed as indicated by diagram A of Fig. 2. The induced potential between the pick-up electrodes 30 and 31 is picked up and supplied to galvanometer 39 when the contacts of the switch 34 are closed. The timing of the switch 34 with respect to the switch 15 is such that the potential is picked up between the electrodes 30 and 31 only when the current flow between the electrodes 22 and 25 is interrupted by the switch 15. The picked-up potential accordingly constitutes the out-of-phase or imaginary component of the earth current potential.

When the switch 15 is open and the switch 34 is closed, the switch 42 is also closed. This causes a second current to be passed through the earth between electrodes 22 and 25 from the source 10, the value of which may be regulated by the variable resistance 60. The effects of this second current are caused to oppose the effects of the first current by suitably positioning the reversing switch 53.

Hereinafter the current that flows into the earth through switch 15 will be referred to as the "first current"; and the current flowing into the earth through switch 42, will be referred to as the "second current."

In making a measurement, the position of switch 53 is so chosen, and the value of resistance 60 is so adjusted that a null balance is obtained on the galvanometer 39. When this condition is obtained, the in-phase component of the potential produced by the second current exactly balances the out-of-phase component of the potential produced by the first current. These two currents are measured by ammeters 16' and 16 respectively.

The phase angle of the potential produced between electrodes 30 and 31 by the first current can now be determined. The tangent of this phase angle is equal to the ratio of the second current to the first current when these two currents are adjusted to produce a null balance on the galvanometer 39.

This ratio may be measured directly by the circuit including the voltmeter 74 which operates as follows: Current flowing in the line 11 produces a potential drop across the resistance 71 and the current flowing in the line 11' causes a potential drop across the resistance 71'. The potential drops across the resistances 71 and 71' produce charges on the condensers 73 and 73' respectively. These condensers discharge across the resistances 75 and 75' respectively and produce across these resistances potential drops which are proportional to the respective charges. By adjusting the contact 76 of the resistance 75 until a null balance is obtained on the voltmeter 74, the ratios of these potentials may be obtained directly from a scale indicating the position of said contact 76. This scale may be graduated to read directly in ratios or may be graduated to read in phase angles. Consequently, a direct reading of the phase angle between the first current and the picked up potential is obtained.

These measurements are repeated at different frequencies by varying the speed of operation of reversing switches 15, 34 and 42 and a log of the variation of phase angle with frequency is thus obtained.

It has been found that the presence of oil and other valuable minerals in the ground causes significant anomalies in the phase angle. The behavior of the phase angle with variations in frequency can thus be used as a direct indication of the presence of these materials.

The reversing switch 34 serves as a rectifier to rectify the potential impulses which are picked up by the pick-up electrodes 30 and 31 and thus permits the use of a direct current measuring instrument, such as the galvanometer 39.

The effect of any residual earth current which would tend to produce a constant direct potential across the electrodes 30 and 31 is eliminated by suitable adjustment of the potentiometer 81. This adjustment may be made, for example, while no current is flowing through the earth circuit, so that the only effect of the galvanometer 39 represents the effect of the residual earth current. It may also be made during operation of the system inasmuch as the residual earth current, which is a uni-directional current, is reversed by the reversing switch 34 to produce an alternating current at the galvanometer 39, causing fluctuation of the galvanometer. The adjustment of the contact 82 may accordingly be made to eliminate these fluctuations of the galvanometer. Any drift in the natural earth potential will be immediately perceived and can be compensated for by readjustment of the potentiometer. If desired, the switch 34 may be adjusted to short circuit the galvanometer 39 during potential gap intervals so as to prevent potential surges when the reversing contacts close.

Although a specific embodiment of the invention has been shown for purposes of illustration, it is understood that the invention is not to be restricted thereto but is capable of various uses as will be readily apparent to a person skilled in the art. The invention is to be limited only in accordance with the scope of the following claims:

What is claimed is:

1. The method of electrical prospecting which comprises passing through the earth a current from a direct current source, periodically interrupting and reversing said current at a controlled low frequency with predetermined current gap intervals at each interruption, picking up the potential between spaced points within the field of influence of said earth current during the current gap intervals, passing a second current from a direct current source through the earth during each current gap interval in a direction to oppose the picked-up potential, regulating said second direct current to exactly balance out the picked-up potential and measuring the ratio between said first and second direct currents when said balance is obtained.

2. The method of electrical prospecting which comprises passing through the earth between spaced current electrodes a current from a direct current source, periodically interrupting and reversing said current at controlled low frequency with predetermined gap intervals at each reversal, deriving during said current gap intervals an out-of-phase picked-up potential between a pair of pick-up electrodes located at spaced points within the field of influence of said earth current, reversing said out-of-phase picked-up potential periodically to produce a uni-directional potential, supplying said uni-directional potential to a direct current measuring instrument, passing a second current from a direct current source through the earth during each current gap interval in a direction to oppose the picked-up potential, regulating said second current to exactly balance out the picked-up potential as indicated by said direct current measuring instrument, and measuring the ratio between said first and second currents when said balance is obtained.

3. The method of electrical prospecting which comprises passing through the earth between spaced current electrodes a current from a direct current source, periodically interrupting and reversing said current at controlled low frequency with predetermined gap intervals at each reversal, deriving during said current gap intervals an out-of-phase picked-up potential between a pair of pick-up electrodes located at spaced points within the field of influence of said earth current, reversing said out-of-phase picked-up potential periodically to produce a uni-directional potential, supplying said uni-directional potential to a direct current measuring instrument, passing a second current from a direct current source through the earth during said current gap intervals, reversing said second current in synchronism with said out-of-phase, picked-up potential to produce an earth potential opposing said picked-up potential, regulating said second current to exactly balance out the picked-up potential, and measuring the ratio between said first and second currents when said balance is obtained.

4. The method of electrical prospecting which comprises passing through the earth between spaced current electrodes a current from a direct current source, periodically interrupting and reversing said current at controlled low frequency with predetermined gap intervals at each reversal, deriving during said current gap intervals an out-of-phase picked-up potential between a pair of pick-up electrodes located at spaced points within the field of influence of said earth current, reversing said out-of-phase picked-up potential periodically to produce a uni-directional potential, supplying said uni-directional potential to a direct current measuring instrument, passing a second current from a direct current source through the earth during said current gap intervals, reversing said second current in synchronism with said out-of-phase, picked-up potential to produce an earth potential opposing said picked-up potential, regulating said second current to exactly balance out the picked-up potential, deriving potentials proportional to the respective first and second currents, and measuring the ratio of said derived potentials.

5. The method of electrical prospecting which comprises passing through the earth between spaced current electrodes a current from a direct current source, periodically interrupting and reversing said current at controlled low frequency with predetermined gap intervals at each reversal, deriving during said current gap intervals an out-of-phase picked-up potential between a pair of pick-up electrodes located at spaced points within the field of influence of said earth current, reversing said out-of-phase picked-up potential periodically to produce a uni-directional potential, supplying said uni-directional potential to a direct current measuring instrument, passing a second current from a direct current source through the earth during said current gap intervals, reversing said second current in synchronism with said out-of-phase, picked-up potential to produce an earth potential opposing said picked-up potential, regulating said second current to exactly balance out the picked-up potential, deriving potentials proportional to the respective first and second currents, balancing an adjustable portion of the larger derived potential against the smaller derived potential and deriving from said adjustment a measure of the phase angle of the earth potential.

6. A system for electrical prospecting comprising an earth current circuit including a source of direct current, spaced earth current electrodes and connections supplying current from said source to said electrodes for passing a current through the earth, means in said circuit to interrupt and reverse said current at a controlled low frequency with controlled current gap intervals at each interruption, a potential circuit including potential pick-up electrodes located at spaced points within the field of influence of said earth current, indicating means in said potential circuit responsive to the picked-up potential, connections supplying a second current from said source to said first electrodes in a direction to oppose the picked-up potential, including a reversing means to interrupt and reverse said second current, said second reversing means being timed to supply said second current to said electrodes only during said current gap intervals, and means adjusting the value of said second current to exactly balance out the picked-up potential and produce a null reading of said indicating means.

7. A system for electrical prospecting comprising an earth current circuit including a source of direct current, spaced earth current electrodes and connections supplying current from said source to said electrodes for passing a current through the earth, means in said circuit to interrupt and reverse said current at a controlled low frequency with controlled current gap intervals at each interruption, a potential circuit including potential pick-up electrodes located at spaced points within the field of influence of said earth current, indicating means in said potential circuit responsive to the picked-up potential, connections supplying a second current from said source to said first electrodes in a direction to oppose the pick-up potential, including a reversing means to interrupt and reverse said second current, said second reversing means being timed to supply said second current to said electrodes only during said current gap intervals, means adjusting the value of said second current to exactly balance out the picked-up potential and produce a null reading of said indicating means, and means responsive to the first and second currents to indicate the ratio therebetween.

8. A system for electrical prospecting comprising an earth current circuit including a source of direct current, spaced earth current electrodes and connections supplying current from said source to said electrodes for passing a current through the earth, means in said circuit to interrupt and reverse said current at a controlled low frequency with controlled current gap intervals at each interruption, a potential circuit including potential pick-up electrodes located at spaced points within the field of influence of said earth current, indicating means in said potential circuit responsive to the picked-up potential, connections supplying a second current from said source to said first electrodes in a direction to oppose the picked-up potential including a reversing means to interrupt and reverse said second current, said second reversing means being timed to supply said second current to said electrodes only during said current gap intervals, means adjusting the value of said second current to exactly balance out the picked-up potential and produce a null reading of said indicating means, a measuring circuit including members connected to develop potential drops proportional to said first and second currents, and means adjusting and balancing said potential drops to determine the ratio therebetween.

9. A system for electrical prospecting comprising an earth current circuit including a source of direct current, spaced earth current electrodes and connections supplying current from said source to said electrodes for passing a current through the earth, means in said circuit to interrupt and reverse said current at a controlled low frequency with controlled current gap intervals at each interruption, a potential circuit including potential pick-up electrodes located at spaced points within the field of influence of said earth current, indicating means in said potential circuit responsive to the picked up potential, connections supplying a second current from said source to said first electrodes in a direction to oppose the picked-up potential, including a reversing means to interrupt and reverse said second current, said second reversing means being timed to supply said second current to said electrodes only during said current gap intervals, means adjusting the value of said second current to exactly balance out the picked-up potential and produce a null reading of said indicating means, a measuring circuit including members connected to develop potential drops proportional to said first and second currents, condensers connected to be charged by said potential drops, resistors connected to discharge said condensers, and means indicating the ratio of the potential drops in said last resistances.

10. A system for electrical prospecting comprising an earth current circuit including a source of direct current, a pair of spaced earth electrodes and a motor driven reversing switch connected between said source and said electrodes for interrupting and reversing the earth current at a predetermined controlled low frequency with definite adjustable gap periods at each interruption, a potential circuit including potential pick-up electrodes located at spaced points lying within the field of influence of said earth current, a D. C. potential indicating device connected to said pick-up electrodes to indicate the potential impressed thereby on said potential circuit, a reversing switch driven in unison with said first reversing switch and connected in said potential circuit between said pick-up electrodes and said indicating device, said last reversing switch being displaced in phase with respect to said first reversing switch for closing said potential circuit only when said first switch is in open position and vice versa and being timed to convert the potential picked-up during said closed circuit periods into a unidirectional potential suited to actuate said indicating device, a second current supply circuit connecting said current source to said earth electrodes including a third reversing switch driven in unison with said second reversing switch and timed to close said second supply circuit when said potential circuit is closed and vice versa and connected to supply current to said earth electrodes in a direction to oppose the picked-up potential, means adjusting the value of the current in said second supply circuit to balance out the picked-up potential as indicated by said indicating device, and means determining the ratio between the current flowing in the circuits controlled by said first and third reversing switches respectively.

11. A system as set forth in claim 10 in which said last means comprises a pair of resistors connected respectively in said last circuits to develop potential drops proportional to the respective currents, a pair of condensers connected respectively to accumulate charges by said potential drops, a pair of discharge resistances connected across the respective condensers to develop potential drops proportional to the respective charges, and a balancing circuit to determine the ratio between said last drops.

12. A system as set forth in claim 10 in which said last means comprises a pair of resistors connected respectively in said last circuits to develop potential drops proportional to the respective currents, a pair of condensers connected respectively to accumulate charges by said potential drops, a pair of discharge resistances connected across the respective condensers to develop potential drops proportional to the respective charges, an indicating device, means connecting said discharge resistances to supply opposed potential drops to said last indicating device, and means adjusting the portion of the potential drop of one of said discharge resistances that is supplied to said last indicating device so as to produce a null balance thereof.

HAAKON M. EVJEN.